(12) United States Patent
Lee et al.

(10) Patent No.: US 8,043,733 B2
(45) Date of Patent: Oct. 25, 2011

(54) BIT PATTERNED MEDIUM

(75) Inventors: Hoo-san Lee, Osan-si (KR); Sung-chul Lee, Osan-si (KR); Hoon-sang Oh, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 141 days.

(21) Appl. No.: 12/039,112

(22) Filed: Feb. 28, 2008

(65) Prior Publication Data

US 2009/0061259 A1 Mar. 5, 2009

(30) Foreign Application Priority Data

Aug. 30, 2007 (KR) .................. 10-2007-0087692

(51) Int. Cl.
*G11B 5/66* (2006.01)
(52) U.S. Cl. ....................................... 428/827; 428/800
(58) Field of Classification Search .............. 428/827
See application file for complete search history.

(56) References Cited

U.S. PATENT DOCUMENTS

| | | |
|---|---|---|
| 2007/0281078 A1* | 12/2007 | Kikitsu et al. ................ 427/127 |
| 2008/0057349 A1* | 3/2008 | Berger et al. .............. 428/836.2 |

* cited by examiner

*Primary Examiner* — Mark Ruthkosky
*Assistant Examiner* — Gary Harris
(74) *Attorney, Agent, or Firm* — Sughrue Mion, PLLC (57) ABSTRACT

A bit patterned medium in which an exchange coupling layer induces exchange coupling between adjacent bits in order to reduce a switching field difference resulting from different magnetization directions of bits. The exchange coupling layer is disposed either over or under a recording layer having a plurality of bits. The exchange coupling layer induces exchange coupling between a bit which is to be recorded and an adjacent bit and reduces a switching field difference resulting from a difference between the magnetization direction of the bit to be recorded and the magnetization direction of neighboring bits due to an exchange coupling force generated during the exchange coupling.

13 Claims, 8 Drawing Sheets

UNIT CELL : 6nm×6nm×10nm, GAP : 2nm
TOTAL CELL : 99×99×1
DAMPING CONSTANT : 0.25
TIME STEP : 1ps
Ms = 100,200,300,400 emu/cc
A* = 0.03 e-6 erg/cm$^2$
Ku = 3.0 e6 erg/cc

BIT COERCIVE FORCE : 5000 O$_e$

| OCCURRENCE OF EXCHANGE COUPLING | ADDITIONAL FIELD |
|---|---|
| YES | 4000 O$_e$ |
| NO | 3000 O$_e$ |

FIG. 7B

BIT PATTERNED MEDIUM

CROSS-REFERENCE TO RELATED PATENT APPLICATIONS

This application claims priority to Korean Patent Application No. 10-2007-0087692, filed on Aug. 30, 2007, and all the benefits accruing therefrom under 35 U.S.C. §119, the contents of which are incorporated herein by reference in their entirety.

BACKGROUND OF THE INVENTION

1. Field of the Invention

The present invention relates to a perpendicular magnetic recording medium and, more particularly, to a bit patterned medium where bits, which are units of data, are isolated in the form of islands.

2. Description of the Related Art

Since hard disk drives (HDDs) using a magnetic recording medium have high capacity and high speed access, HDDs are used as the main storage media for various digital devices as well as computers. The capacity of magnetic recording media is determined by tracks per inch (TPI), which is track density in the rotational direction of a disk, and by bits per inch (BPI), which is bit density on tracks. One of the most popular magnetic recording media, continuous magnetic recording media where bits are not physically isolated, have limitations in increasing TPI and BPI by reducing a bit size or a track pitch. This is because, when a bit size or a track pitch is reduced below a limit, noise increases due to magnetic interaction between adjacent bits and recording stability degrades drastically.

In bit patterned media where bits, which are units of data, are isolated in the form of islands, the bits are formed along tracks of a rotating disk and spaces between the patterned tracks or bits are empty or filled with a nonmagnetic material. Since there is no interaction between adjacent bits, the bit patterned media can achieve high recording density.

However, one of the requirements for bit patterned media applications is the minimization of a switching field distribution of bits. Factors affecting the switching field of each bit include the dimension and magnetic characteristics of each bit, and the magnetization directions of neighboring bits. It is preferable that the dimensions and magnetic characteristics of bits be uniform. A difference between the dimensions or magnetic characteristics of bits can be kept within allowable ranges by controlling manufacturing processes. However, a switching field difference due to magnetostatic interaction between adjacent bits cannot be reduced by controlling manufacturing processes. In order to reduce a switching field difference, it is necessary to reduce a bit size or a saturation magnetization (Ms). However, in such a case, output is reduced, thereby causing another problem.

SUMMARY OF THE INVENTION

Exemplary embodiments of the present invention provide a bit patterned medium that can reduce a switching field difference between bits due to a magnetostatic force.

The present invention also provides a bit patterned medium that can increase the stability of adjacent bits which are not recorded in a write mode by reducing a switching field difference.

According to an aspect of the present invention, there is provided a bit patterned medium comprising: a magnetic recording layer including a plurality of bits; and an exchange coupling layer inducing exchange coupling between adjacent bits of the magnetic recording layer.

The exchange coupling layer may be formed either over or under the magnetic recording layer.

The exchange coupling layer may have an exchange coupling constant ranging from 0.001e-6 erg/cm$^2$ to 1e-6 erg/cm$^2$.

The exchange coupling layer may be formed of a ferromagnetic material.

The exchange coupling layer may be formed of any one selected from a Co alloy, such as CoCrPtB, CoCrPt, or CoPt, an alloy having an L1$_0$ ordered phase, such as CoPt or FePt, CoFeCrB, CoFe, NiFe, and CoNiFe.

The magnetic recording layer may be formed of any one selected from a Co alloy, such as CoCrPtB, CoCrPt, or CoPt, and an alloy having an L1$_0$ ordered phase, such as CoPt or FePt.

The bit patterned medium may further comprise: a substrate on which the magnetic recording layer is formed; a soft magnetic underlayer disposed between the magnetic recording layer and the substrate; and an intermediate layer disposed between the magnetic recording layer and the soft magnetic underlayer, wherein the exchange coupling layer is disposed between the intermediate layer and the magnetic recording layer.

The bit patterned medium may further comprise: a substrate on which the magnetic recording layer is formed; a soft magnetic underlayer disposed between the magnetic recording layer and the substrate; and an intermediate layer disposed between the magnetic recording layer and the soft magnetic underlayer, wherein the exchange coupling layer is formed on a surface of the magnetic recording layer.

A protective layer for protecting the magnetic recording layer may be formed on an uppermost layer of the bit patterned medium.

The magnetic recording layer may include bits and nonmagnetic regions formed between the bits, wherein the nonmagnetic regions are filled with a non-magnetic material.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF EXEMPLARY EMBODIMENTS OF THE INVENTION

The invention is described more fully hereinafter with reference to the accompanying drawings, in which exemplary embodiments of the invention are shown. This should not be construed as limiting the claims to the exemplary embodiments shown. Rather, these embodiments are provided to convey the scope of the invention to those skilled in the art. In the drawings, the size and relative sizes of elements and regions may be exaggerated for clarity.

It will be understood that when an element or layer is referred to as being "on", "disposed on", "disposed", or "between" another element or layer, it can be directly on, disposed on, disposed, or between the other element or layer, or intervening elements or layers can be present.

The terms "first," "second," and the like, "primary," "secondary," and the like, as used herein do not denote any order, quantity, or importance, but rather are used to distinguish one element, region, component, layer, or section from another. The terms "front", "back", "bottom", and/or "top" are used herein, unless otherwise noted, merely for convenience of description, and are not limited to any one position or spatial orientation.

The terms "a" and "an" do not denote a limitation of quantity, but rather denote the presence of at least one of the referenced item. The suffix "(s)" as used herein is intended to include both the singular and the plural of the term that it modifies, thereby comprising one or more of that term (e.g., the layer(s) includes one or more layers).

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various exemplary embodiments.

The endpoints of all ranges directed to the same component or property are inclusive of the endpoint and independently combinable, e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc. The modifier "about" used in connection with a quantity is inclusive of the stated value and has the meaning dictated by the context (e.g., includes the degree of error associated with measurement of the particular quantity).

Unless defined otherwise, technical and scientific terms used herein have the same meaning as is commonly understood by one of skill in the art to which this invention belongs.

Figure 1:
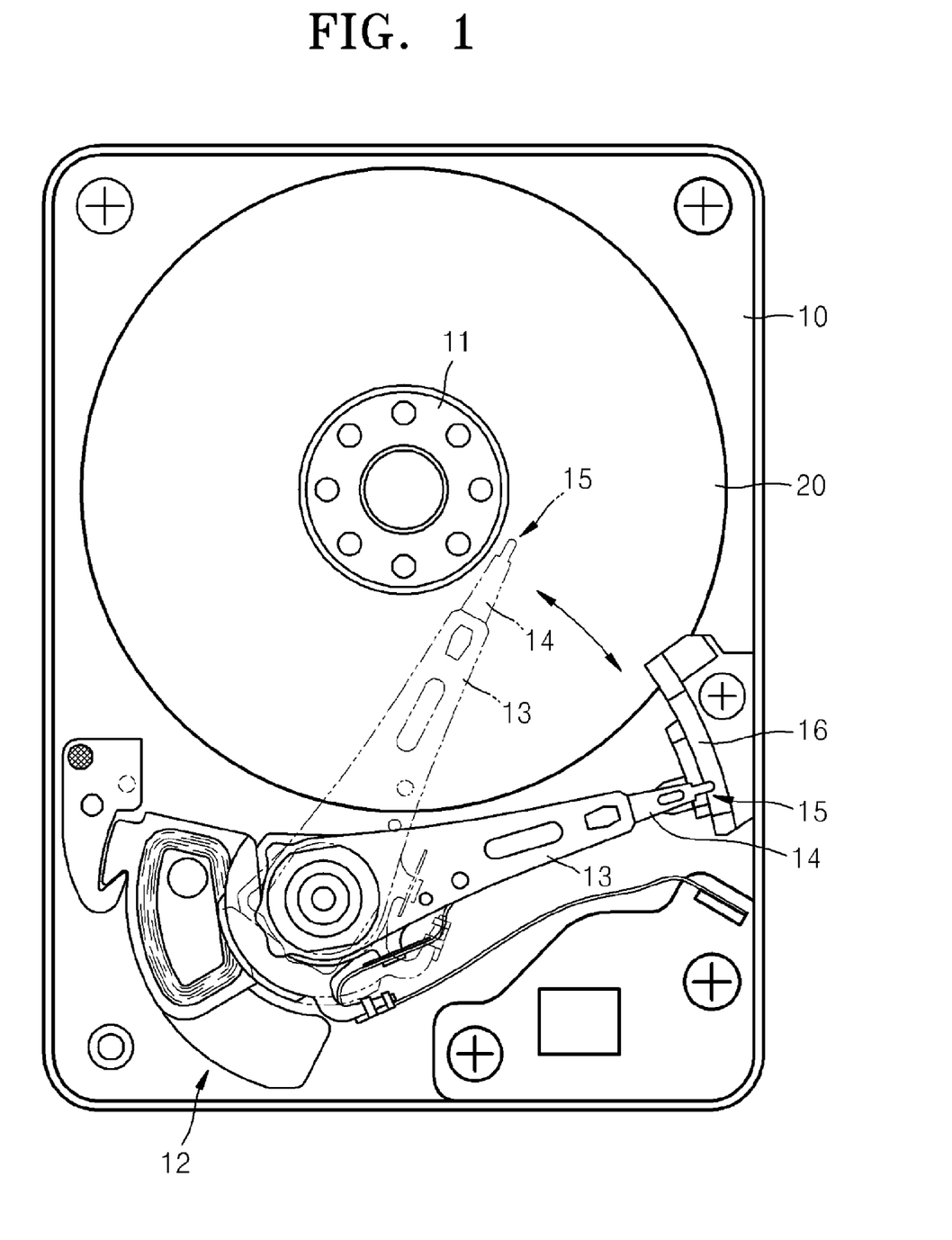
FIG. 1 is a plan view of a hard disk drive (HDD) to which a bit patterned medium, e.g., a disk, is applied according to an exemplary embodiment of the present invention.

FIG. 1 is a plan view of a hard disk drive (HDD) to which a bit patterned medium is applied according to an exemplary embodiment of the present invention.

Referring to FIG. 1, a disk-shaped bit patterned medium 20, e.g., a disk, is mounted on a spindle motor 11 that is installed on a side of a base 10. A magnetic head 15 is fixed to a bottom surface of a front end of a suspension assembly 14 coupled to an actuator arm 13. The magnetic head 15 is installed to reciprocate in a radial direction of the disk from a radially inner line to a radially outer line according to the operation of the actuator arm 13, and fly at a predetermined height above a surface of the bit patterned medium 20 that is rotating at high speed. The magnetic head 15 is lifted due to an air bearing generated between the magnetic head 15 and the bit patterned medium 20. A voice coil motor 12 installed at a side of the actuator arm 13 provides a force which moves the actuator arm 13. Reference numeral 16 denotes a ramp on which the magnetic head 15 is parked.

Figure 2:
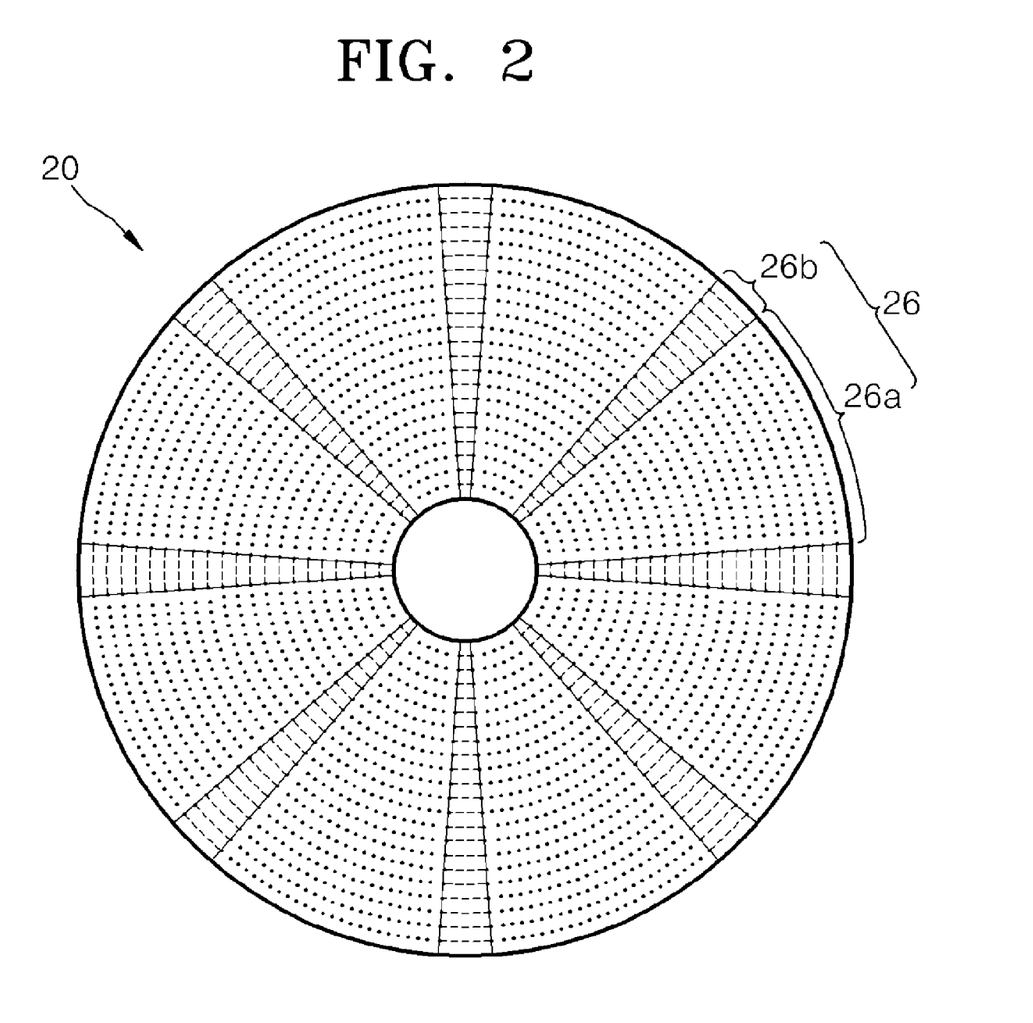
FIG. 2 is a plan view of the bit patterned medium of FIG. 1.
Figure 3A:
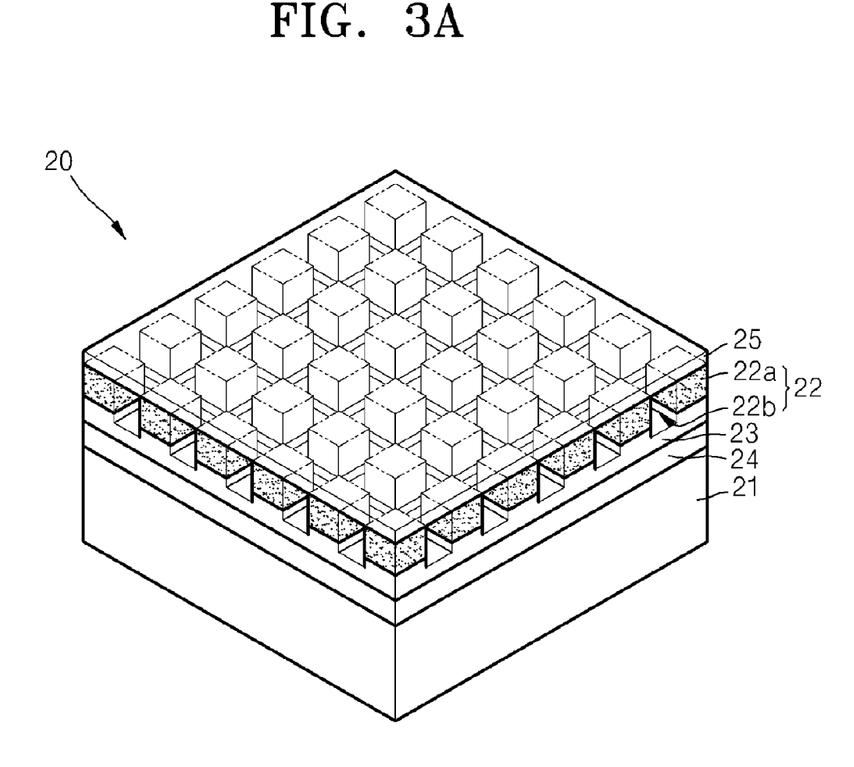
FIG. 3A is a perspective view of a part of a bit patterned medium according to an exemplary embodiment of the present invention.
Figure 3B:
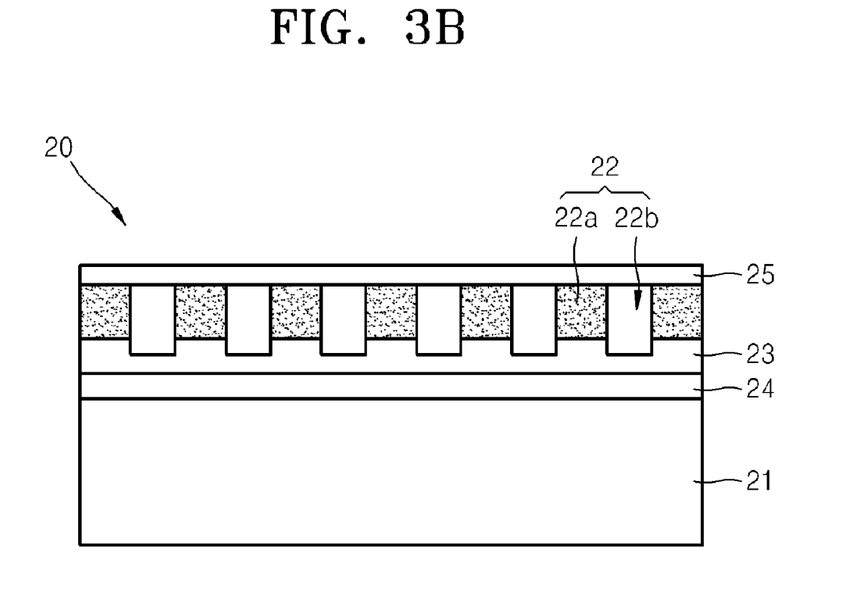
FIG. 3B is a cross-sectional view taken along line III-III in FIG. 3A.

FIG. 2 is a plan view of the disk 20 of FIG. 1. Referring to FIGS. 2, 3A and 3B, the bit patterned medium 20 includes a disk-shaped substrate 21 and a magnetic recording layer 22 formed on at least one surface of the substrate 21. The magnetic recording layer 22 includes a plurality of sectors 26, which are disposed at regular intervals about the center of the bit patterned medium 20. Each of the sectors 26 includes a data region 26a and a servo region 26b.

FIG. 3A is a perspective view of a part of a bit patterned medium 20 according to an exemplary embodiment of the present invention. FIG. 3B is a cross-sectional view of the part of the bit patterned medium 20 of FIG. 3A.

Referring to FIGS. 3A and 3B, the bit patterned medium 20 includes a disk-shaped substrate 21 formed of a non-magnetic material, and a magnetic recording layer 22 including a plurality of bits 22a and non-magnetic regions 22b formed between the bits 22a. A soft magnetic underlayer 24 is disposed between the magnetic recording layer 22 and the substrate 21, and an intermediate layer 23 is disposed between the magnetic recording layer 24 and the soft magnetic underlayer 24.

According to the present exemplary embodiment, an exchange coupling layer 25, which induces exchange coupling between adjacent bits 22a, is formed on the magnetic recording layer 22. Thus, the exchange coupling layer 25 is an example of a means for inducing exchange coupling between adjacent bits 22a. The bits 22a may be formed by nanoimprinting. The exchange coupling force of the exchange coupling layer 25 can be adjusted by varying the material and thickness of the exchange coupling layer 25. A protective layer or lubricating layer (not shown) may be formed on the exchange coupling layer 25.

Figure 4A:
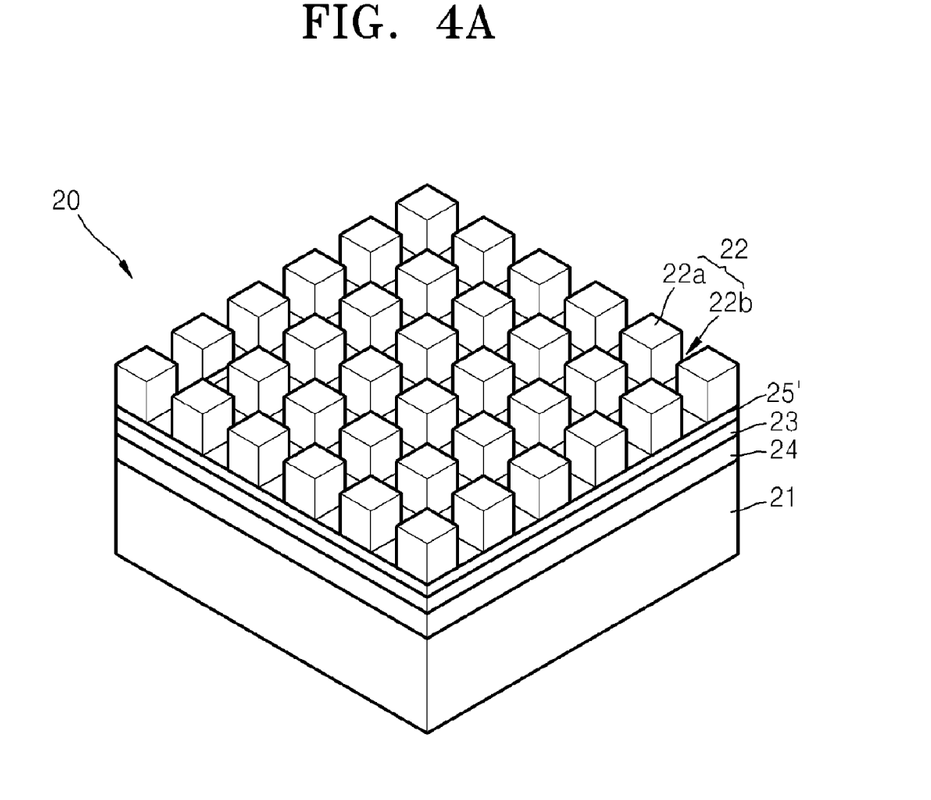
FIG. 4A is a perspective view of a part of a bit patterned medium according to another exemplary embodiment of the present invention.
Figure 4B:
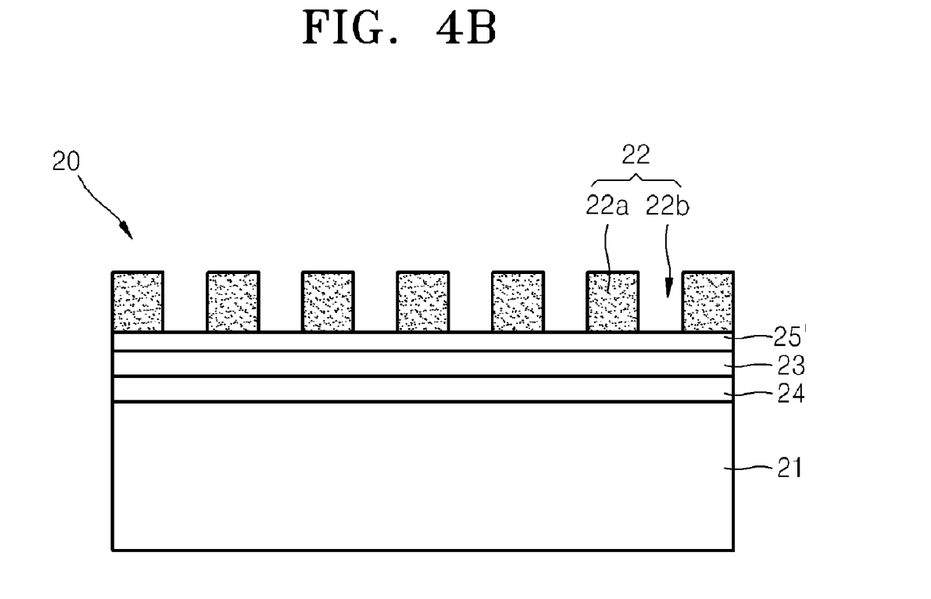
FIG. 4B is a cross-sectional view taken along line IV-IV in FIG. 4A.

FIG. 4A is a perspective view of a part of a bit patterned medium 20' according to another exemplary embodiment of the present invention. FIG. 4B is a cross-sectional view of the part of the bit patterned medium 20' of FIG. 4A.

Referring to FIGS. 4A and 4B, similar to the previous embodiment, the bit patterned medium 20' includes a disk-shaped substrate 21 formed of a non-magnetic material, and a magnetic recording layer 22' including a plurality of bits 22a and non-magnetic regions 22b formed between the bits 22a. A soft magnetic underlayer 24 is disposed between the magnetic recording layer 22' and the substrate 21, and an intermediate layer 23 is disposed between the magnetic recording layer 22' and the soft magnetic underlayer 24.

According to the present exemplary embodiment, an exchange coupling layer 25', which induces exchange coupling between adjacent bits 22a, is formed between the magnetic recording layer 22' and the intermediate layer 23. The exchange coupling layer 25' is another example of a means for inducing exchange coupling between adjacent bits 22a. The exchange coupling force of the exchange coupling layer 25' can be adjusted by varying the material and thickness of the exchange coupling layer 25'. A protective layer and/or lubricating layer (not shown) may be formed on the magnetic recording layer 22'. According to the present embodiment, the exchange coupling layer 25' disposed under the magnetic recording layer 22' may be formed of the same material as that of the magnetic recording layer 22', and may be integrally formed with the magnetic recording layer 22'. In order to integrally form the exchange coupling layer 25' with the magnetic recording layer 22', one magnetic material layer corresponding to the exchange coupling layer 25' and the magnetic recording layer 22' is formed, and then nanoimprinted to a predetermined depth so that the magnetic recording layer 22' has the plurality of bits 22a and the exchange coupling layer 25' is continuously formed under the bits 22a. In this case, the height of the bits 22a can be adjusted by controlling the depth of the nanoimprinted magnetic material layer.

In the bit patterned media 20 and 20', the width of the non-magnetic regions 22b may range from several to tens of nanometers (nm), and the non-magnetic regions 22b may be empty or filled with a non-magnetic material. The bits 22a of the magnetic recording layer 22 or 22' may be formed of a Co alloy, such as CoCrPtB, CoCrPt, or CoPt, or an alloy having an L10 ordered phase, such as CoPt or FePt.

The soft magnetic underlayer 24 may be any one of a CoZrNb layer, a CoFeZrNb layer, a NiFe layer, a NiFeMo layer, and a CoFeNi layer. The soft magnetic underlayer 24 may have a thickness of 5 to 300 nm. The intermediate layer 23 is formed of a non-magnetic material and adapted to improve the orientation characteristics of the magnetic recording layer 22 or 22' formed over the intermediate layer 23. For example, the intermediate layer 23 may be formed of any one selected from Ti, Ru, Pt, Cu, Au, RuCr, and MgO. The intermediate layer 23 may have a thickness ranging from several to tens of nanometers (nm).

The exchange coupling layer 25 or 25' may have a thickness of about 2 to 3 nm, and may be formed of any ferromagnetic material that can induce exchange coupling between adjacent bits 22a of the magnetic recording layer 22 or 22'. For example, the exchange coupling layer 25 or 25' may be formed of a Co alloy, such as CoCrPtB, CoCrPt, or CoPt, or an alloy having an L10 ordered phase, such as CoPt or FePt, like the magnetic recording layer 22 or 22'. Alternatively, the exchange coupling layer 25 or 25' may be formed of any one selected from CoFeCrB, CoFe, NiFe, and CoNiFe. The exchange coupling layer 25 or 25' may be disposed both over and under the magnetic recording layer 22 or 22'.

Simulation conditions under which a bit patterned medium, e.g., a disk, was tested and simulation results obtained under the simulation conditions according to an exemplary embodiment of the present invention will now be explained.

Figure 5:
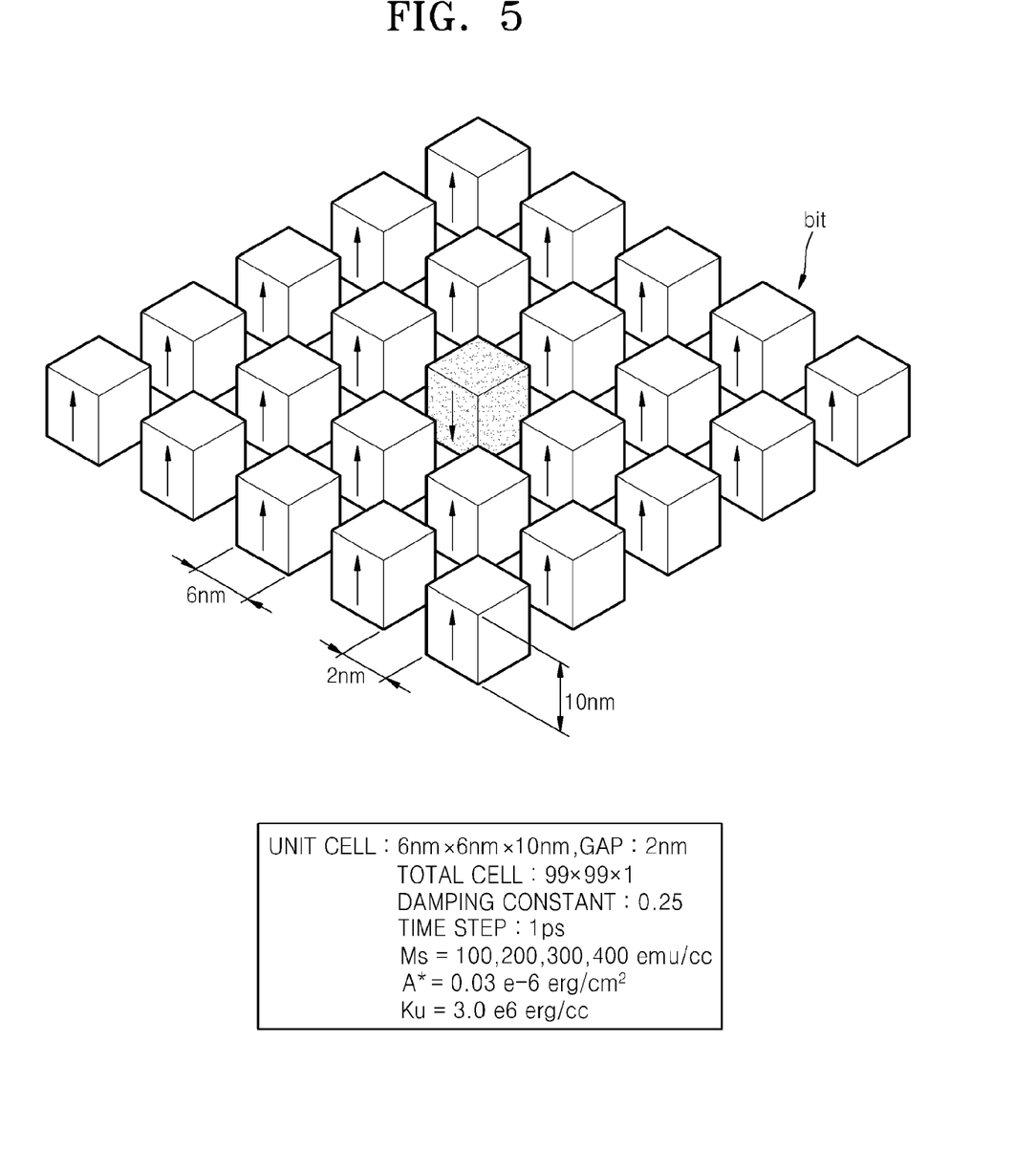
FIG. 5 is a perspective view illustrating simulation conditions under which a bit patterned medium, e.g., a disk, was tested according to an exemplary embodiment of the present invention.

A conventional bit patterned medium is structured such that bits, which are units of data, are completely isolated from other bits. There is no exchange coupling between the physically isolated bits that are affected by only a magnetostatic force. In the bit patterned medium, switching fields of the bits should be uniform as described above. There are many factors that would affect the switching fields. Simulations showed that an exchange coupling layer inducing exchange coupling between bits can reduce a switching field difference. In the simulations, in order to verify a reduction in a switching field difference, a magnetostatic force arising from magnetic fields generated by neighboring bits was obtained while other factors were fixed. FIG. 5 is a perspective view illustrating simulation conditions under which a bit patterned medium was tested according to an exemplary embodiment of the present invention. Referring to FIG. 5, the length, width, and height of each bit were respectively 6 nm, 6 nm, and 10 nm, and total bits were 99×99 in horizontal and vertical directions. A damping constant was 0.25, a time step was 1 pico-second (ps), and the saturation magnetization Ms of a magnetic material was set to 100, 200, 300, and 400. An exchange coupling constant A* was 0.03e-6 erg/cm2, and a magnetic anisotropy constant Ku was 3.0e6 erg/cc.

Figure 6:
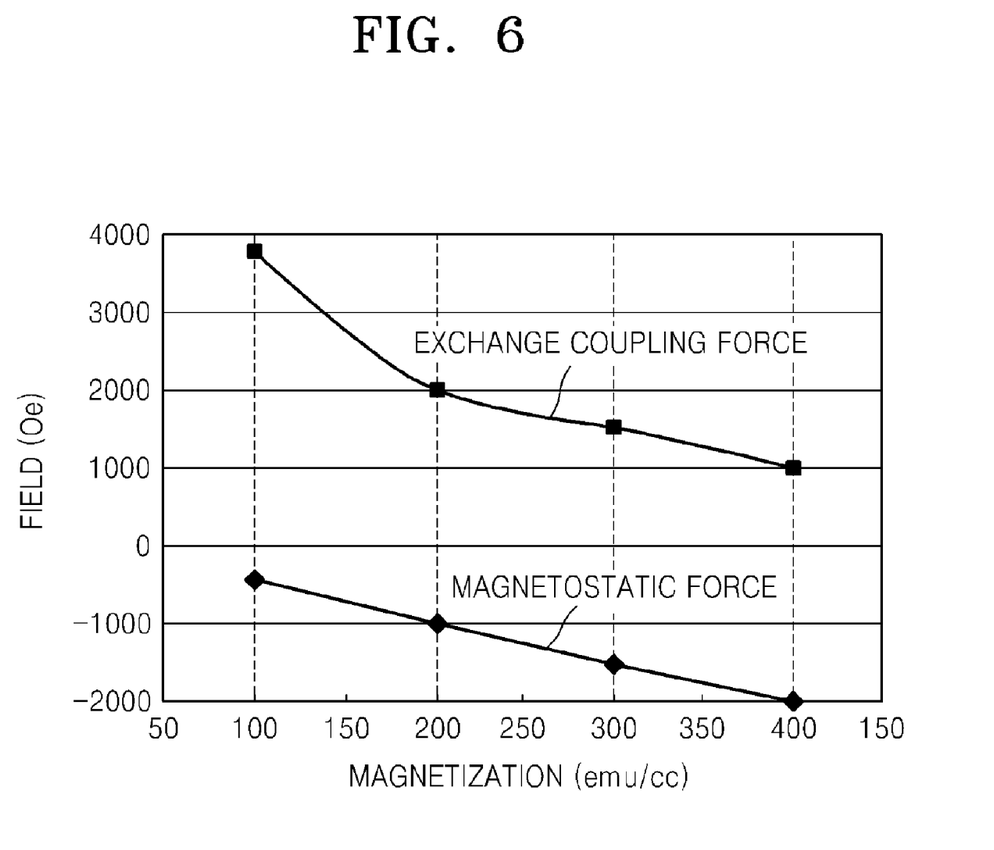
FIG. 6 is a graph of simulation results obtained under the simulation conditions of FIG. 5, illustrating magnetostatic and exchange coupling forces corresponding to four saturation magnetization values.

FIG. 6 illustrates simulation results obtained under the simulation conditions of FIG. 5. Referring to FIG. 6, when a saturation magnetization Ms was 400 emu/cc, a magnetostatic force arising from neighboring bits was approximately 2000 Oe. When a specific bit was magnetized in the same direction as that of the neighboring bits, the magnetostatic force obstructed the magnetization. When the specific bit was magnetized in a direction opposite to that of the neighboring bits, the magnetostatic force helped the magnetization. Accordingly, in both cases, a switching difference was 4000 Oe. When there was exchange coupling between adjacent bits, an exchange coupling force was 3800, 2000, 1500, and 1100 Oe according to a saturation magnetization Ms. The exchange coupling force was inversely proportional to the saturation magnetization Ms, and offsets the magnetostatic force during magnetization. For example, when a saturation magnetization Ms was 400, a magnetostatic force was approximately 2000 Oe, and when an exchange coupling constant was 0.03e-6 erg/cm2 at this time, an exchange coupling force was approximately 1000 Oe, and thus a switching field difference was approximately 2000 Oe.

Since such a low switching field difference can vary depending on the degree of exchange coupling between bits by the exchange coupling layer, a desired switching field difference can be obtained by selecting an appropriate exchange coupling constant. That is, when there is exchange coupling between adjacent bits according to the present invention, an exchange coupling force and a magnetostatic force offset, thereby reducing a switching field difference resulting from different magnetization directions of neighboring bits.

Figure 7A:
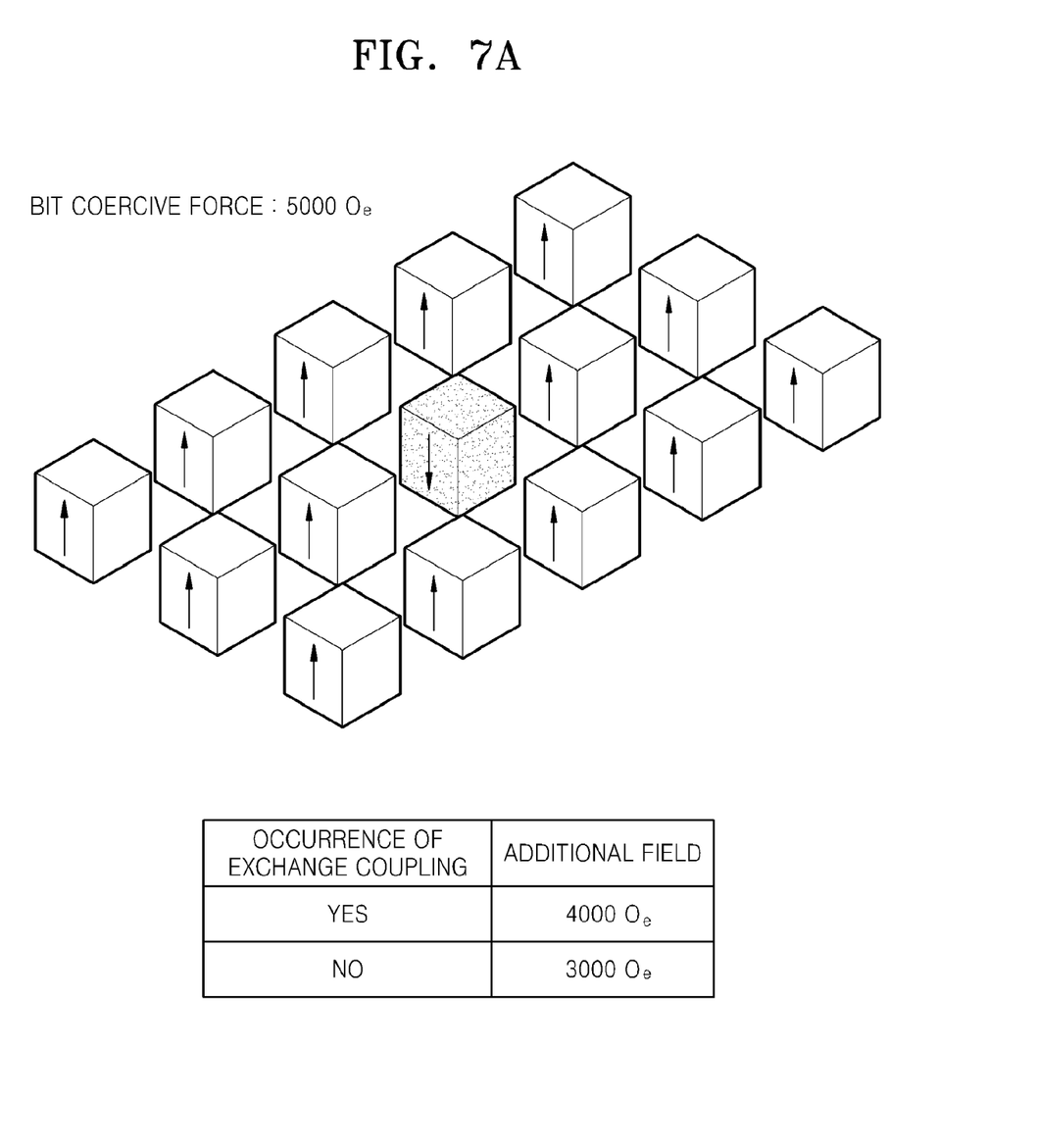
FIGS. 7A and 7B are perspective views illustrating switching fields respectively when a specific bit is recorded in a direction opposite to that of neighboring bits and when a specific bit is recorded in the same direction as that of neighboring bits.
Figure 7B:
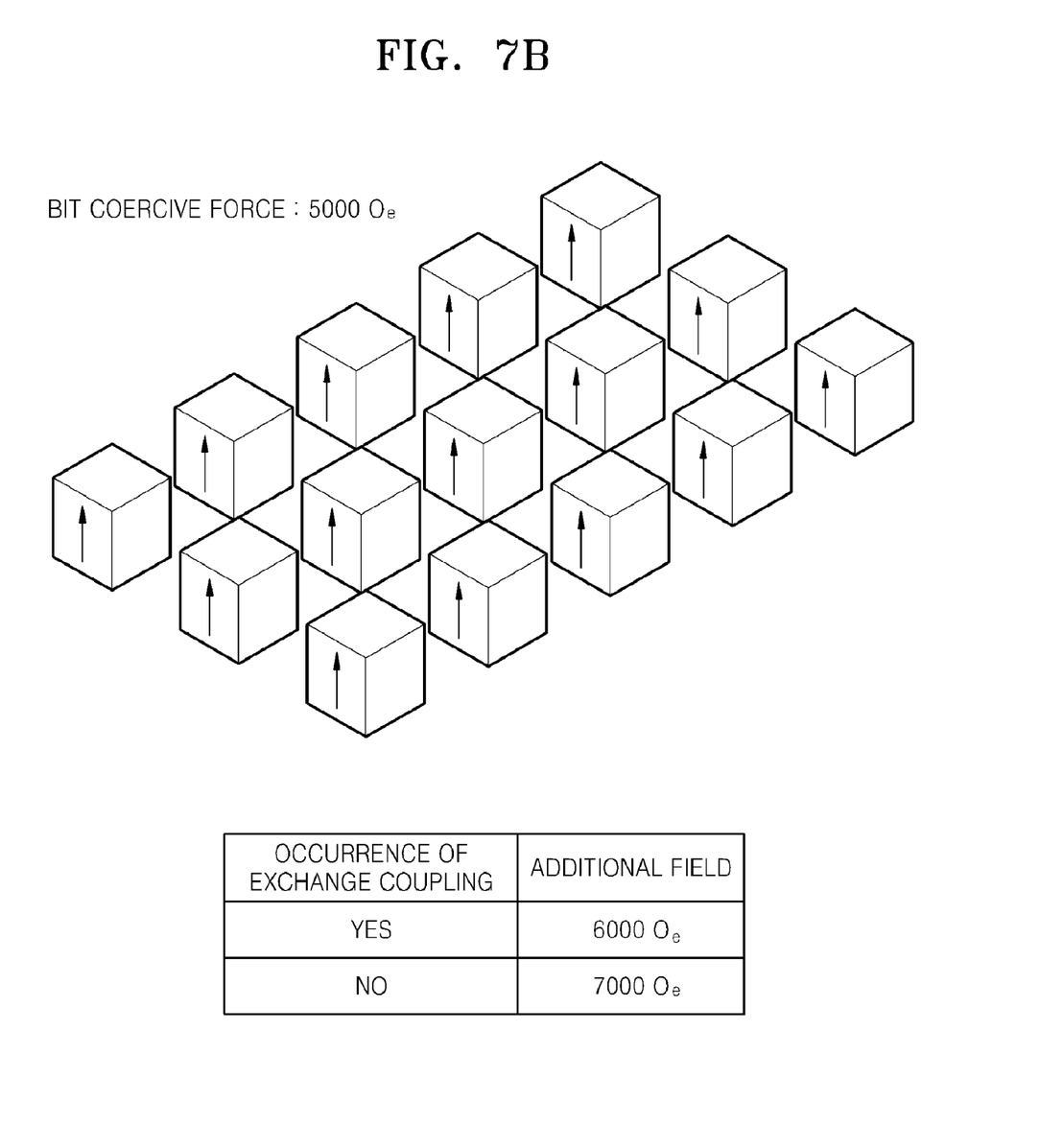

FIGS. 7A and 7B are perspective views illustrating switching fields respectively when a specific bit is recorded in a direction opposite to that of neighboring bits and when a specific bit is recorded in the same direction as that of neighboring bits.

In both cases, it is assumed that the saturation magnetization Ms of a magnetic recording layer is 400 emu/cc. As described above with reference to the simulation results, when a saturation magnetization Ms is 400 emu/cc, a magnetostatic force is approximately 2000 Oe, and when it is assumed at this time that an exchange coupling constant is 0.03e-6 erg/cc, an exchange coupling force is 1000 Oe.

Referring to FIG. 7A, when a bit which is to be recorded, that is, a bit at the center of the figure, is recorded in a direction different from that of neighboring bits and there is exchange coupling, a switching field is 4000 Oe, whereas when a bit to be recorded is recorded in a direction different from that of neighboring bits and there is no exchange coupling, a switching field is 3000 Oe. In detail, when a specific bit to be recorded is recorded in a direction opposite to that of neighboring bits, since a magnetostatic force of approximately 2000 Oe in the same direction as the direction of the neighboring bits is already applied to the specific bit to be recorded, an additional field necessary for recording is 3000 Oe. However, when there is an exchange coupling force, since a field of 1000 Oe in the opposite direction to the direction of the neighboring bits is additionally applied, an additional field is 4000 Oe.

Referring to FIG. 7B, when a bit which is to be recorded, that is, a bit at the center of the figure, is recorded in the same direction as that of neighboring bits and there is exchange coupling, a switching field is 6000 Oe, whereas when a bit to be recorded is recorded in the same direction as that of neighboring bits and there is no exchange coupling, a switching field is 7000 Oe. In detail, when a specific bit to be recorded is recorded in the same direction as that of neighboring bits, since a magnetostatic force of 2000 Oe in the opposite direction to that of the neighboring bits is already applied to the specific bit to be recorded, an additional field necessary for recording is 7000 Oe. However, when there is an exchange coupling force, since a field of 1000 Oe in the same direction as that of the neighboring bits is additionally applied, an additional field is 6000 Oe.

That is, when there is no exchange coupling, a switching field difference is 4000 Oe. However, when there is exchange coupling between bits according to the present invention, a switching field difference is 2000 Oe, which can be controlled by varying a saturation magnetization Ms and an exchange coupling constant A*.

Considering existing various magnetic recording materials, the exchange coupling constant of the exchange coupling layer between bits ranges from 0.001e-6 erg/cm2 to 1e-6 erg/cm2, and preferably ranges from 0.01e-6 erg/cm2 to 0.1e-6 erg/cm2, thereby effectively reducing a switching field difference.

While the present invention has been particularly shown and described with reference to exemplary embodiments thereof, it will be understood by those of ordinary skill in the art that various changes in form and details may be made thereto without departing from the spirit and scope of the present invention as defined by the following claims.

What is claimed is:

1. A bit patterned medium comprising:
a magnetic recording layer including a plurality of bits; and
an exchange coupling layer which induces exchange coupling between adjacent bits of the magnetic recording layer,
wherein each of the plurality of bits has a column shape having a predetermined height and a top surface,
wherein the plurality of bits are separated from each other by non-magnetic regions,
wherein the exchange coupling layer is formed of a ferromagnetic material, and
wherein the exchange coupling layer has an exchange coupling constant ranging from 0.001e-6 erg/cm$^2$ to 1e-6 erg/cm$^2$.

2. The bit patterned medium of claim 1, wherein the exchange coupling layer is disposed one of over and under the magnetic recording layer.

3. The bit patterned medium of claim 1, wherein the exchange coupling layer is formed of any one selected from a Co alloy, such as CoCrPtB, CoCrPt, or CoPt, an alloy having an L1$_0$ ordered phase, such as CoPt or FePt, CoFeCrB, CoFe, NiFe, and CoNiFe.

4. The bit patterned medium of claim 3, wherein the magnetic recording layer is formed of any one selected from a Co alloy, such as CoCrPtB, CoCrPt, or CoPt, and an alloy having an L1$_0$ ordered phase, such as CoPt or FePt.

5. The bit patterned medium of claim 1, wherein the magnetic recording layer is formed of any one selected from a Co alloy, such as CoCrPtB, CoCrPt, or CoPt, and an alloy having an L1$_0$ ordered phase, such as CoPt or FePt.

6. The bit patterned medium of claim 1, further comprising:
a substrate on which the magnetic recording layer is formed;
a soft magnetic underlayer disposed between the magnetic recording layer and the substrate; and
an intermediate layer disposed between the magnetic recording layer and the soft magnetic underlayer.

7. The bit patterned medium of claim 6, wherein the exchange coupling layer is disposed one of over the magnetic recording layer and disposed between the magnetic recording layer and the intermediate layer.

8. The bit patterned medium of claim 1, wherein the exchange coupling layer is disposed under the magnetic recording layer, and is integrally formed with the magnetic recording layer.

9. The bit patterned medium of claim 1, wherein the bit patterned medium is disk-shaped.

10. A bit patterned medium comprising:
a magnetic layer including a plurality of bits; and
an exchange coupling layer configured to induce exchange coupling between a bit which is recorded and an adjacent bit of the plurality of bits thereby reducing a switching field difference,
wherein each of the plurality of bits has a column shape having a predetermined height and a top surface,
wherein the plurality of bits are separated from each other by non-magnetic regions,
wherein the exchange coupling layer is formed of a ferromagnetic material, and
wherein the exchange coupling layer has an exchange coupling constant ranging from 0.001e-6 erg/cm$^2$ to 1e-6 erg/cm$^2$.

11. A bit patterned medium comprising:
a magnetic recording layer including a plurality of bits arranged in a regular pattern; and
an exchange coupling layer which induces exchange coupling between adjacent bits of the magnetic recording layer,
wherein the exchange coupling layer is formed of a ferromagnetic material, and
wherein the exchange coupling layer has an exchange coupling constant ranging from 0.001e-6 erg/cm$^2$ to 1e-6 erg/cm$^2$.

12. The bit patterned medium of claim 11, wherein the plurality of bits are arranged in a substantially uniform pattern.

13. The bit patterned medium of claim 11, wherein the plurality of bits are configured as an ordered array of uniform islands.

* * * * *